United States Patent [19]

Williams et al.

[11] Patent Number: 4,619,437
[45] Date of Patent: Oct. 28, 1986

[54] ADJUSTABLE TORQUE LIMITING VALVE HANDLE

[76] Inventors: William J. Williams, 395 Mulberry St., Vider, Tex. 77662; Richard E. Purkey, Rte. 3, Box 151A, Kirbyville, Tex. 77956

[21] Appl. No.: 823,670

[22] Filed: Jan. 29, 1986

Related U.S. Application Data

[63] Continuation-in-part of Ser. No. 797,750, Nov. 12, 1985, abandoned, which is a continuation of Ser. No. 581,068, Feb. 17, 1984, abandoned.

[51] Int. Cl.[4] ............................................. F16K 31/44
[52] U.S. Cl. ........................................ 251/81; 251/79; 403/36
[58] Field of Search ...................... 464/35, 36; 192/38, 192/47; 251/79, 81; 192/43.2, 45, 45.1, 46, 56 R; 403/35, 36

[56] References Cited

U.S. PATENT DOCUMENTS

| | | | |
|---|---|---|---|
| 1,075,311 | 10/1913 | Beck . | |
| 2,288,955 | 7/1942 | Richardson et al. | 74/549 |
| 2,600,674 | 6/1952 | Nathins | 464/36 |
| 2,602,351 | 7/1952 | Ringler et al. | 74/548 |
| 2,733,622 | 2/1956 | Evans | 81/52.4 |
| 2,768,806 | 10/1956 | Koehler | 251/174 |
| 2,797,564 | 7/1957 | Bonneau et al. | 64/29 |
| 2,797,592 | 7/1957 | Marrapese | 74/548 |
| 2,855,914 | 10/1958 | Himes | 123/139 |
| 2,881,602 | 4/1959 | Baker et al. | 64/29 |
| 2,983,121 | 5/1961 | Naas | 64/29 |
| 3,053,498 | 9/1962 | Dumm | 251/81 |
| 3,441,115 | 4/1969 | Gunther | 192/56 |
| 3,827,671 | 8/1974 | Bolden et al. | 251/84 |
| 3,910,308 | 10/1975 | Mack | 137/533 |
| 3,942,337 | 3/1976 | Leonard et al. | 464/36 |
| 4,012,966 | 3/1977 | Lieberman et al. | 74/533 |
| 4,077,503 | 3/1978 | Lieberman et al. | 192/18 |
| 4,132,129 | 1/1979 | Pratt | 74/533 |
| 4,199,964 | 4/1980 | Grey | 64/29 |
| 4,526,194 | 7/1985 | Miller | 137/358 |

FOREIGN PATENT DOCUMENTS 1038855 9/1958 Fed. Rep. of Germany .
44-13463 6/1969 Japan .

Primary Examiner—Martin P. Schwadron
Assistant Examiner—John C. Fox
Attorney, Agent, or Firm—Vaden, Eickenroht, Thompson & Jamison

[57] ABSTRACT

Disclosed is a torque limiting valve handle having one more independently adjustable spring loaded balls urged in contact with depressions formed in the inside surface of a housing adapted for external manual engagement. The adjustment of the torque limit setting of the valve handle is protected from tampering or inadvertent modification by unauthorized personnel by the access to the adjustment requiring disassembly of the parts. One embodiment provides a torque lock in one direction of rotation. Another embodiment provides a torque limit override feature in either direction of rotation by an axial displacement of the housing of the handle with respect to an adaptor fixedly secured to the valve stem of the valve to which it is secured.

8 Claims, 13 Drawing Figures

ADJUSTABLE TORQUE LIMITING VALVE HANDLE

This application is a continuation-in-part application of our co-pending patent application Ser. No. 06/797,750, filed Nov. 12, 1985 now abandoned, which is a continuation application of patent application Ser. No. 06/581,068, filed Feb. 17, 1984, now abandoned.

FIELD OF THE INVENTION

This invention relates generally to valve handles and more particularly to torque limiting valve handles.

BACKGROUND OF THE INVENTION

Torque limiting valve handles are in wide use in petrochemical or other industries wherein hazardous and/or combustible materials are involved. The valve handles are equipped with means for limiting the torque that can be manually applied through the valve stem to prevent damage to the valve and possible accidents involving the hazardous materials.

U.S. Pat. No. 3,441,115, which issued to Gunther, shows such a torque limiting valve handle having a handle housing threadedly engaged with a cap portion. A ball retainer is adapted for mounting on a valve stem and is constrained between the housing and cap portion. A plurality of balls are carried within longitudinal openings in the ball retainer and urged by a stack of Belleville washers into engagement with multiple depressions in an inner surface of the handle housing. The valve handle will rotate as a unit when a torque is applied below a predetermined level. When a torque is applied below a predetermined level, such as when the valve is in a fully open or closed position, the force of the Belleville washers is overcome and the balls are forced out of engagement with the openings. This allows the handle housing and cap portion to rotate independently of the ball retainer and valve stem and prevents excessive torque from being applied to the valve. Adjustment of the force exerted by the Belleville washers is provided by relative rotation of the handle housing with respect to the cap portion and secured by two externally accessible set screws.

However, Gunther and similar conventional designs suffer from several limitations. First, since the adjustment means is externally accessible, unauthorized personnel are able to change the level of force exerted by the Belleville washers to a level which may allow damage to occur to the valve. This may occur intentionally or unintentionally, but in either case, it is undesirable. Secondly, the use of common Belleville washers in contact with all of the ball elements prevents independent adjustment of the force acting on each of the balls.

Therefore, it is a principal feature and advantage of this invention to provide an improved torque limiting valve handle in which adjustment of the torque limit is not possible while the handle is mounted on a valve stem.

It is another feature and advantage of the present invention to provide an improved torque limiting valve handle in which the force exerted on each of the balls is independently adjustable.

It is still another feature and advantage of this invention to provide an improved torque limiting valve handle that permits the operator to temporarily overcome the slippage of handle to valve stem should the slippage not be caused by intentional torque limiting, but by wear or unintended improper adjustment of the torque limit.

SUMMARY OF THE INVENTION

The first embodiment of the invention includes generally an adaptor suitable for connection to the valve stem, a housing in the form of a cap that fits over the adaptor and two means for providing a rotational relationship between the housing and the adaptor. The first of these means includes a spring and ball structure operating between the outside end surface of the adaptor and the inside cap surface of the housing. Springs of this structure are included in accommodating housing bores at least one of them having a screw adjustment that is accessible through a backplate. The housing includes depressions at the same radial dimension as the bores in the adaptor in which the balls operate. In the presence of excess rotational torque on the housing caused by the valve stem being in its fully closed position, instead of further rotation of the adapter, the balls are forced inwardly against their springs and the housing is rotated until the balls operate in conjunction with the next set of aligned depressions.

The second means for providing a rotational relationship in the first embodiment includes spring-loaded ratchets operating from suitable cavities in the adapter with respect to suitable side grooves in the housing. Hence, slippage between housing and adaptor occurs in one direction for preventing overtightening in the closed direction, but not in the open direction. Please note that a fully closed valve may be stuck and need quite a bit of torque to open. The side ratchet mechanism provides this positive certainty of rotation.

The second embodiment includes generally an adaptor, a housing cap and means for providing a rotational relationship between the two. No side operating ratchet mechanism is included. At least one spring operates in a suitable bore in the adaptor, which bore is also threaded for receiving a screw therein for adjusting the compression on the spring. A balls sits on top of the spring and operates in conjunction with a plurality of depressions spaced at a common radial distance with the adaptor bore. The end face of the adaptor and the inside surface of the housing are spaced apart.

Below the torque limit, operation of the housing turns the adaptor and valve stem through the spring, ball and a housing depression, in much the same fashion as for the first embodiment. When the torque limit is reached, the action is again much like for the first embodiment, namely, the ball is pushed in against the spring and the housing rotates without moving the adaptor until the ball snaps into the next depression.

In the event that the operator wishes to rotate the adaptor when the torque limit has been exceeded, this is possible by applying axial pressure on the housing. Such pressure pushes the ball inwardly until the spring bottom out and before the end surface of the adapter makes contact with the inside surface of the cap. Now the housing and adapter can be rotated together. This is useful when the valve is stuck or when the spring adjustment is too loose for intended normal operation because of wear or for some other reason. It should be noted that the absence of the ratchet feature prevents inadvertent overtightening in either the closed or the open position.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only preferred embodiments of the invention and are therefore not to be considered limiting of its scope as the invention may admit to other equally effective embodiments.

In the Drawings

DESCRIPTION OF THE PREFERRED EMBODIMENTS

Figure 1B:
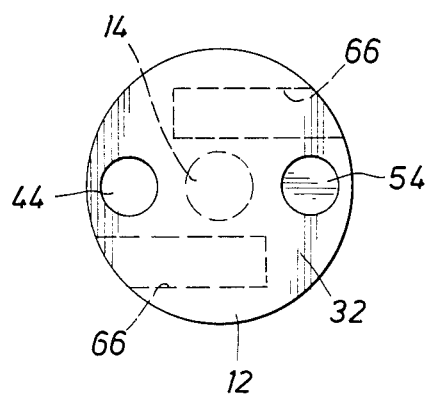
FIG. 1B is a top view of the adaptor of the valve handle shown in FIG. 1A.
Figure 2A:
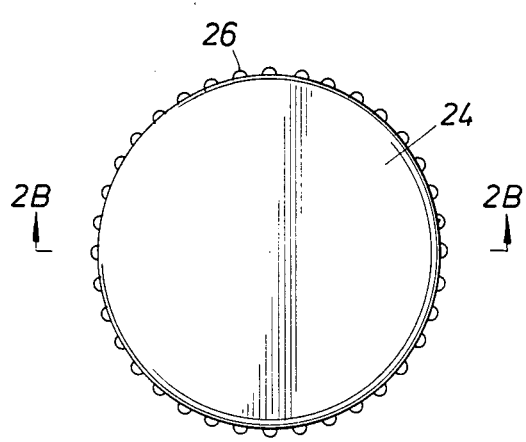
FIG. 2A is a top view of the housing of a valve handle used with the adaptor shown in FIGS. 1A–1C.
Figure 1A:
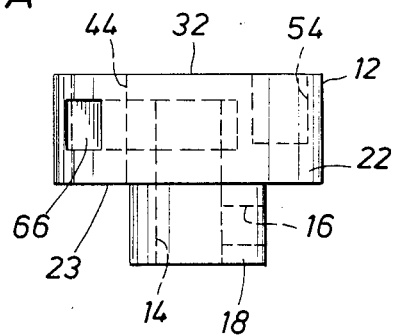
FIG. 1A is a side elevation view of a first embodiment of the adaptor of a valve handle in accordance with this invention.
Figure 2B:
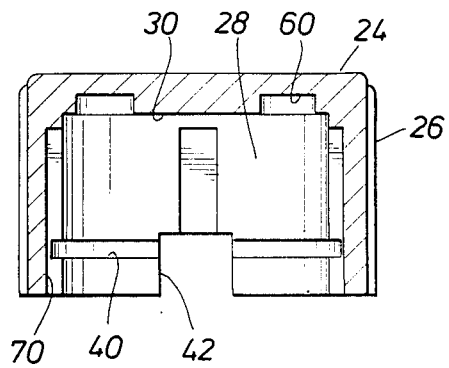
FIG. 2B is an upright cross-sectional view of the housing of the valve handle shown in FIG. 2A.
Figure 1C:
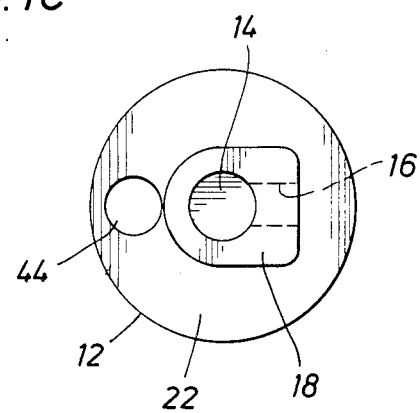
FIG. 1C is a bottom view of the adaptor of the valve handle shown in FIG. 1A.
Figure 2C:
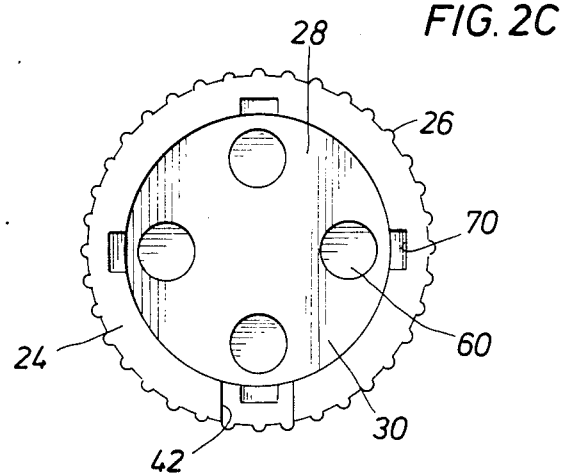
FIG. 2C is a bottom view of the housing of the valve handle shown in FIG. 2A.
Figure 3:
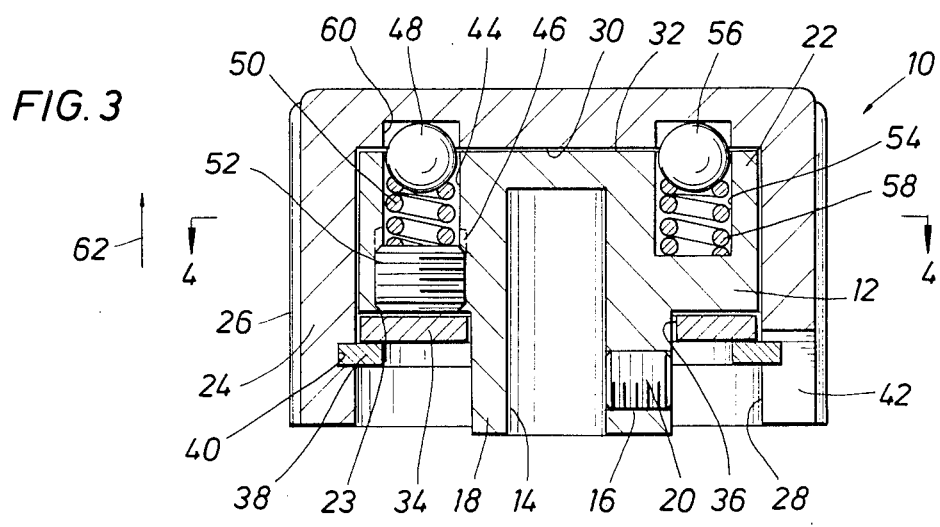
FIG. 3 is an upright vertical cross-sectional view of the first embodiment of the valve handle.

Referring to FIG. 3, the reference numeral 10 generally indicates the valve handle of a first embodiment of this invention, which includes adaptor 12, shown in more detail in FIGS. 1A, 1B, and 1C and housing 24 shown in more detail in FIGS. 2A, 2B, and 2C. Adaptor 12 includes concentric opening 14 for insertion of a valve stem (not shown) of a valve and comprises first section 18 nearest the valve (not shown) and cylindrical second section 22 of larger diameter forming both flat end surface 32 facing away from the valve stem and shoulder 23 at the juncture with the first section 18. Set screw 20 is engaged with threaded opening 16 formed in first section 18 so as to secure the adaptor to the valve stem when inserted within opening 14.

Figure 5:
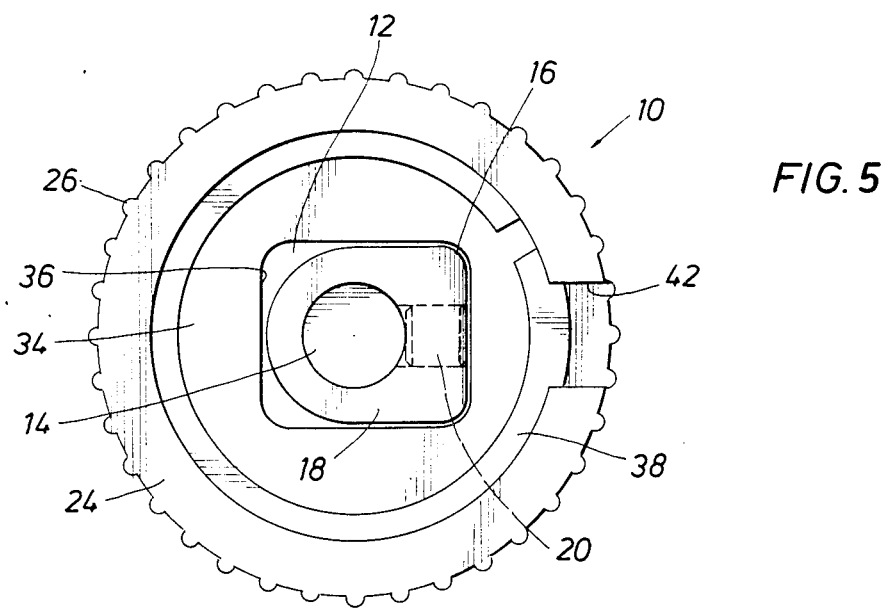
FIG. 5 is a bottom view of the valve handle shown in FIG. 3.
Figure 6:
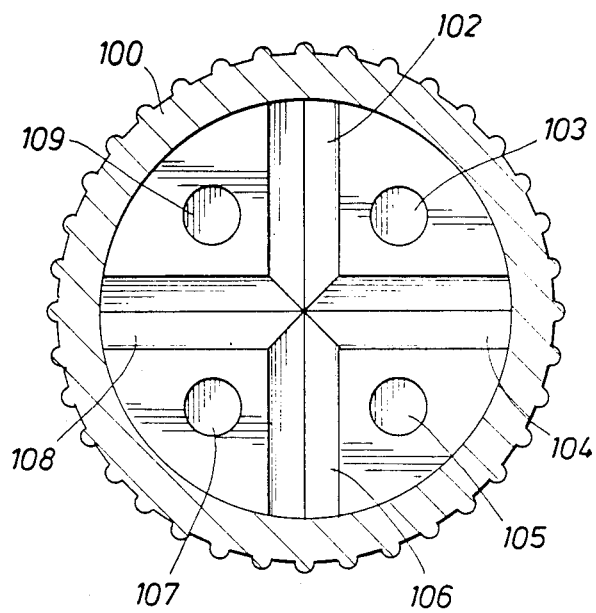
FIG. 6 is a bottom view of the housing of a second embodiment of a valve handle in accordance with this invention.

Housing 24 includes a plurality of external longitudinal ribs 26. Alternatively, this surface may be knurled or otherwise suitably adapted for manual engagement. Housing 24 also includes cup shaped cavity 28 centered around the axis of rotation of the housing, for receiving adaptor 12 so that flat end surface 32 is adjacent surface 30 of the cavity. As is also shown in FIG. 5, back plate 34 is adjacent shoulder 23 of the adaptor and includes rectangular opening 36 in surrounding relation to first portion 18 of the adaptor. Snap ring 38 is positioned within groove 40 of the housing to secure the back plate and the adaptor within cavity 28. Slot 42 is provided in the housing to permit external access to set screw 20 in order to tighten or loosen the set screw and secure or remove the valve handle to the valve stem.

Adaptor 12 includes longitudinal openings 44, only one of which is shown, extending from surface 32 through second section 22. The openings are parallel to the longitudinal axis of rotation of the adaptor and valve stem but are radially offset therefrom. Ball element 48 is carried within the longitudinal opening and is urged along direction 62 towards depressions 60 in surface 30 by a spring or like member 50 which contacts the ball at one end and a set screw 52 engaged within threaded portion 46 of opening 44, at the other end. Adjustment of the force exerted by the spring is enabled by movement of set screw 52 within the opening. If more than one longitudinal opening, spring and ball is provided with the valve handle, the force exerted on each ball is independently adjustable to enable greater control over the composite torque required to disengage the housing from the adaptor.

Adaptor 12 also includes one or more openings 54 extending from surface 30 but only partially through second section 22. Within the opening 54 is carried a similar ball element 56 urged outwardly along direction 62 by a spring 58 contacting the ball and the end of the opening. The force exerted by the spring 54 is not adjustable in this case.

Figure 4:
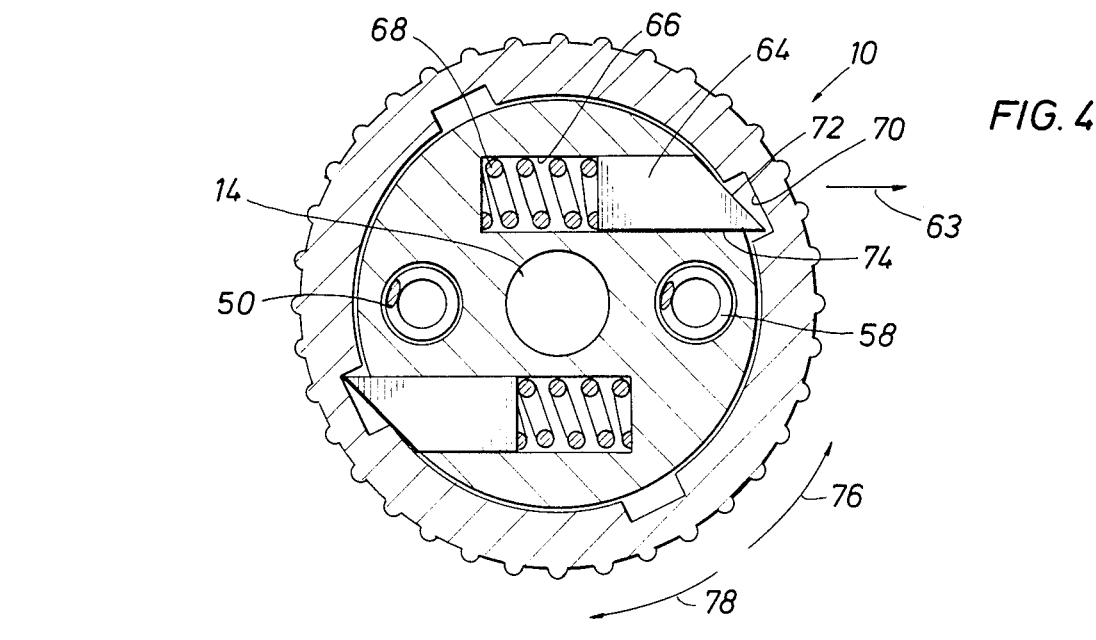
FIG. 4 is a horizontal cross-sectional view along plane 4—4 of FIG. 3.

As shown in FIG. 4, the illustrated embodiment of the invention includes one or more ratcheting member 64 slidingly carried within chambers 66 formed in the adaptor transverse to the axis of rotation but offset therefrom. Spring 68 contained within chamber 66 urges the latching member 64 outwardly along direction 63 towards the interior surface of cavity 28 of the housing, which includes a plurality of longitudinal grooves 70. Latching member 64 includes a first surface 72 obliquely inclined with respect to direction 63 and a second surface 74 parallel thereto.

Torque limited valve handles are frequently used in environments including hazardous or combustible materials which frequently are also corrosive. Accordingly, in the preferred embodiments of this invention, the housings are constructed of a material such as fiberglass and the adaptor and the remainder of the components are constructed of stainless steel, which are unaffected by corrosive substances. The structure is not limited to the use of these materials, however.

In operation, the positions of the various set screws within openings 44 are positioned in accordance with the spring constants of each spring to establish a predetermined level of torque necessary to disengage the housing from the adaptor. The components of the valve handle are assembled as shown in FIGS. 3–5. The valve stem (not shown) is inserted into opening 14 of the assembled handle, whereupon set screw 20 is tightened by a suitable tool (not shown) to secure the handle to the valve. As the force exerted on the valve handle is rotated in direction 78, little resistance is met, therefore, the housing and adaptor will move in unison because of the engagement of ball elements 48 and 56 with depression 60. Because of the presence of back plate 34, it would not be possible to change the position of set screw 52 without removing the valve handle from the valve stem and disassembling the handle. During rotation, the sliding contact between oblique surface 72 and the interior surface of cavity 28 forces the latching member back into chamber 66 against the force of spring 68. As soon as the valve stem reaches either its fully open or closed position as a result of rotation in direction 78, the resistance and the torque required to rotate the valve handle will increase to the point where the ball elements 48 and 56 are forced back into openings 44 and 54, respectively, and out of engagement with depressions 60 so that the housing will rotate independently of the adaptor, preventing further movement of the valve stem.

During rotation in direction 76, the housing and adaptor will again move in unison until the valve has reached the opposite point, either fully opened or fully closed, at which point additional resistance will be met. In this case, however, the interaction between the second surface 74 and groove 70 will prevent the housing from rotating independently of the adaptor even when a torque is applied sufficient to disengage the ball elements from the depressions. Of course, the ratchet arrangement can be omitted altogether so that adjustable torque limiting action results in both directions. In addition, certain of the springs may be provided with different spring constants to provide greater control over the composite torque necessary to disengage the housing from the adaptor.

Figure 7:
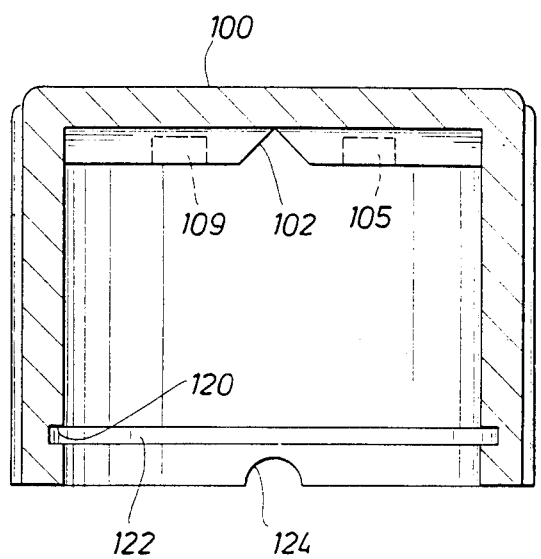
FIG. 7 is a vertical cross-sectional view of the housing shown in FIG. 6.
Figure 8:
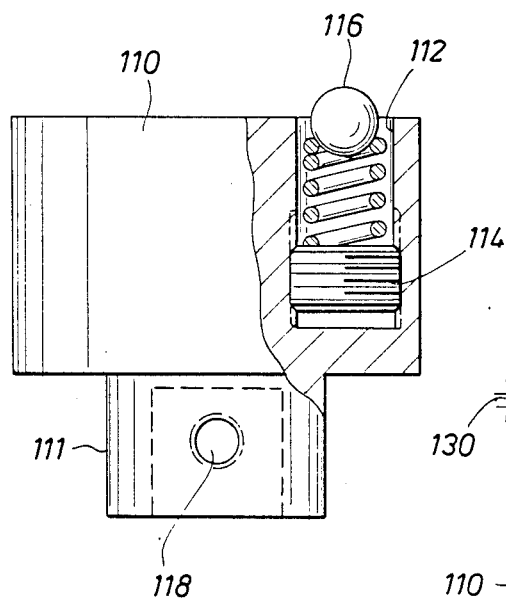
FIG. 8 is a side elevation view of the adaptor used with the housing shown in FIGS. 6–7.

Now referring to FIGS. 6–9, a second embodiment of the invention is illustrated. In this embodiment, circular housing 100 is generally cup-shaped and is provided with a rib or similar suitable structure as a convenience for manually manipulating the handle. Interior transverse surface 134 of the housing includes a plurality of depressions, which may be conveniently in two different forms. Radial grooves 102, 104, 106 and 108 radiate from the center at respective 90° angles. These grooves are conveniently V-shaped in cross-section, as shown in FIG. 7.

Interspersed between grooves 102, 104, 106 and 108 are depressions 103, 105, 107 and 109, respectively. Each of these depressions are at the same radial distance from the center of the housing. Preferably, the depressions are shallower than the V-shaped grooves. The depressions can conveniently be cylindrical or spherical.

Adapter 110 for this embodiment is also circular and fits into the cavity of the housing just described. The main body portion includes a bore 112 which is parallel to the axis of the adaptor and offset therefrom at a radial distance. This radial dimension locates the center of the bore at the same distance that depressions 103, 105, 107 and 109 are from the axis of the housing. Bore 112 is bored so that it opens to transverse end surface 132 of the adaptor. The bore is not bored all the way through the main body of the housing.

Bore 112 is internally threaded in its lower end to receive adjustment screw 114. Screw 114 may conveniently be an Allenhead screw that is accessible through the opening end. A spring 113 is located in bore 112 and a ball 116 rides on the top of the spring for reasons explained hereafter. It should be noted that when ball 116 is depressed so that spring 113 bottoms out, ball 116 is still partially above end surfaces 132 of the adaptor. The force of the spring is determined in part by the characteristics of the spring and in part by the setting of screw 114.

Adaptor 110 also includes an extension end 111 with a side-opening bore for receiving an Allenhead set screw 126 for providing attachment of the adaptor to valve stem 128. A slight notch 124 in the housing allows access to set screw 126 when the housing is assembled to the adaptor.

Figure 9:
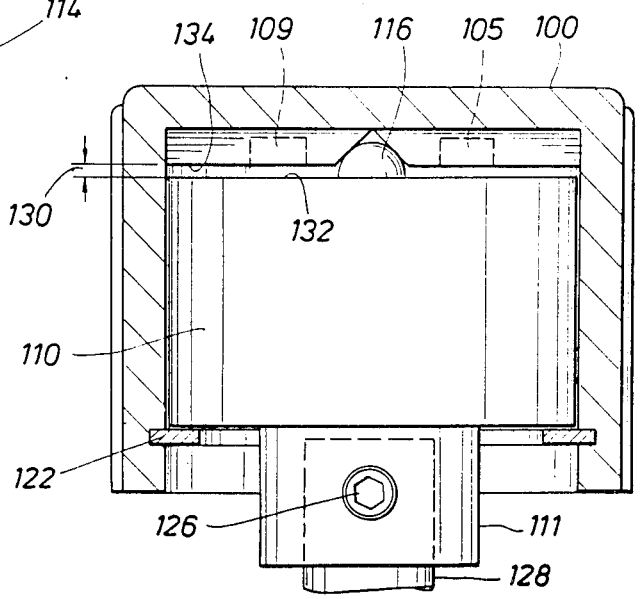
FIG. 9 is a vertical cross-sectional view of the second embodiment of the valve handle.

Now turning to FIG. 9, the assembly of adaptor 110 into housing 100 is illustrated. The axial dimension of the main body of the adaptor is sized so that it fits into the cavity of the housing and is retained in place by snap ring 122 operating within internal peripheral groove 120 in the housing. When the housing and adaptor are assembled, transverse end surface 132 of the adaptor is spaced apart from transverse internal surface 134 of the housing by a distance 130. Ball 116 is shown in V-shaped groove 102. The space is assured by the outward force of spring 113 acting on ball 116.

As mentioned above, the V-grooves are deeper than the intermediate depressions, so the rotation of the handle goes from V-groove to V-groove when the valve handle is operating in normal fashion to prevent overtorquing the valve stem in either direction.

In operation, when there is a little torque on valve stem 128 because its valve is neither in its full open nor its full close position, the outward force of spring 113 is sufficient that the rotation of housing 100 causes the rotation of adaptor 110. When the torque increases beyond a torque limit determined by spring 113, then the further rotation of housing 100 causes ball 116 to push in against spring 113 and housing 116 slips until ball 116 is in the next adjacent depression, either V-groove 104 or 108 depending on the direction of rotation. Further rotation moves the ball from V-groove to V-groove without rotating the adaptor. Hence, the valve stem cannot be given a torque force in either direction that would cause unwarranted damage to the stem.

If the torque limit is to be intentionally exceeded by the operator, then the operator can apply a manual axial force against the housing. Housing 100 will move inwardly toward adaptor 110 as provided by space 130 between the opposing transverse surfaces 132 and 134 until spring 113 bottoms out when the ball is in one of depressions 103, 105, 107 or 109. This allows the rotation of housing 100 and adapter 110 together as before.

It should be noted that one of the reasons for having this override feature is to provide for wearout of the spring or a bad adjustment or adjustment screw 114. Vibration could possibly cause screw 114 to become improperly set. In any event, this feature is available in either direction of rotation and avoids the ratchet structure of the first embodiment discussed above.

The advantage of having the depth of at least one of the depressions shallower than the others is that an extremely loose feeling caused by too much space being available between the transverse surfaces does not make override impossible. The ball is merely manipulated to the shallow depression and torque override is accomplished, as before.

Alternative to the spring bottoming out, a reduced dimension of bore 112 can be provided so that the ball is stopped from further inward movement by the shoulder provided by such reduction. Ball 116 in all events must extend beyond surface 132 so that override of the torque limit operation can be provided.

The embodiment of FIGS. 6–9 has been described in connection with only a single ball. Of course, additional bores similar to bore 112 and additional balls and spring structures operating therewith can be provided, if desired.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. An adjustable torque limiting handle for rotating the stem of a valve to open and close the valve, comprising:

a cylindrical body adapted for mounting on the valve stem with the longitudinal axis of the body coinciding with the axis of rotation of the stem, said body having an outside end surface transverse to said rotation axis, said body further including at least one longitudinally extending blind bore opening into said outside end surface at a location radially spaced apart from said axis of rotation;

a housing having a cup-shaped cavity for receiving said cylindrical body and having an inside transverse surface adjacent said outside transverse surface of said body, said inside transverse surface of said housing having a plurality of radially extending V-grooves at least a portion thereof being radially aligned with said openings in said body, said housing further including a rim adapted for manual engagement;

a ball carried within each of said openings in said body;

a spring mounted in each of said openings independently urging said balls outwardly into engagement with said housing V-grooves; and means mounted in each of said openings for independently adjusting the force exerted by each of said springs to said balls;

said housing being mounted with respect to said cylindrical body to prevent access to said adjusting means, whereby said housing and body will rotate in unison when a torque is applied to the rim of said housing below a predetermined level and said housing will rotate independently of said body when a torque above said predetermined level is applied.

2. The handle of claim 1, wherein said housing includes at least one depression intermediate two of said V-grooves radially aligned with said longitudinal bore in said body, said depression being shallower than said V-grooves.

3. An adjustable torque limiting handle for rotating the stem of a valve to open and close the valve, comprising:

a cylindrical body adapted for mounting on the valve stem with the longitudinal axis of the body coinciding with the axis of rotation of the stem, said body having an outside end surface transverse to said rotation axis, said body further including a longitudinally extending blind bore opening into said outside end surface at a location radially spaced apart from said axis of rotation;

a housing having a cup-shaped cavity for receiving said cylindrical body and having an inside transverse surface spaced apart from said outside transverse surface of said body, said inside transverse surface of said housing having a plurality of depressions concentrically positioned with respect to said rotation axis and radially aligned with said longitudinal bore in said body, said housing further including a rim adapted for manual engagement;

a ball carried at least partially within said bore in said body;

a spring mounted in said bore underneath said ball for urging said ball outwardly into engagement with said housing depressions;

means mounted in said bore for adjusting the force exerted by said spring to said ball;

said housing and body rotating in unison when a torque is applied to the rim of said housing below a predetermined level;

said housing rotating independently of said body when a torque above said predetermined level is applied;

manual pressure on said housing in an axial direction compressing said spring as permitted by the space between said outside end surface of said body and said inside surface of said housing to cause increased torque between said housing and said body to permit rotation of said body even in the presence of a torque above said predetermined level prior to the application of such axial manual pressure.

4. The handle of claim 3, wherein said bore is internally threaded and wherein said means mounted in said bore is externally threaded into said bore at a variable position for determining the compression force on said spring.

5. The handle of claim 3, wherein axial pressure on said housing bottoms out said spring before said outside end surface of said body and said inside surface of said housing come in contact.

6. The handle of claim 3, wherein some of said depressions in said housing are more shallow than other of said depressions.

7. The handle of claim 6, wherein four of said depressions are radial slots, 90° from one another, each of said slots having a V-shaped cross-section.

8. The handle of claim 7, wherein at least one of said depressions is a detent located between two of said slots, said detent being more shallow than said slots.

* * * * *